United States Patent [19]
Yanchich et al.

[11] 3,805,097
[45] Apr. 16, 1974

[54] PIEZOELECTRIC ACCELEROMETER

[76] Inventors: Vladimir Vladimirovich Yanchich, Krasnodarskaya 78, kv. 62; Oleg Pavlovich Kramarov, ul. Stanislavskogo, 161, kv. 1; Vladimir Vasilievich Zalessky, Budenovsky prospekt 96/132, kv. 122, all of Rostov; Boris Anisimovich Kravtsov, Verkhne-Pervomaiskaya ul. 65, korpus 2, kv. 9, Moscow; Jury Mikhailovich Martynenko, 2 Krasnodarskaya ul. 80/2, kv. 79, Rostov, all of U.S.S.R.

[22] Filed: Aug. 7, 1972

[21] Appl. No.: 278,656

[52] U.S. Cl. ................ 310/8.4, 310/9.5, 310/9.6
[51] Int. Cl. ...................... G01p 15/08, H01v 7/00
[58] Field of Search ............. 73/517 R, 516 R, 71.2; 310/8.4, 9.5, 9.6

[56] References Cited
UNITED STATES PATENTS

| 3,304,787 | 2/1967 | Chiku et al. | 73/517 R |
| 2,963,911 | 12/1960 | Courtney-Pratt et al. | 73/517 R |

*Primary Examiner*—James J. Gill
*Attorney, Agent, or Firm*—Eric H. Waters

[57] ABSTRACT

A piezoelectric accelerometer with electrostatic screening having at least one piezoelectric element with electrodes provided between the inertial mass and the foundation. Said accelerometer is fashioned as a single monolithic block made of a piezoelectric material divided, by hollows, into regions serving as the foundation, piezoelectric element, and inertial mass, said hollows accomodating electrodes therein.

6 Claims, 8 Drawing Figures

PIEZOELECTRIC ACCELEROMETER

FIELD OF THE INVENTION

The invention relates to instruments for measuring accelerations and more particularly to piezoelectric accelerometers.

BACKGROUND

Piezoelectric accelerometers are used to measure vibrational or pulse accelerations of parts and units in engines borne essentially by aircraft, rockets, or vessels.

Known in the art is a piezoelectric accelerometer with electrostatic screening, housing at least one piezoelectric element with electrodes and arranged between the inertial mass and the foundation.

Said inertial mass, piezoelectric element with electrodes provided on its working surfaces, and foundation are fashioned in the known accelerometer as separate components made of dissimilar materials and rigidly connected to each other by means of adhesives, the electrostatic screening being insured by a metal body.

Provision of dissimilar materials as well as of adhesive connections affects the stability of the working characteristics of the piezoelectric accelerometer.

Production of quality accelerometers made up of separate units also involves considerable technological difficulties because of the quality finishing of the working surfaces of interconnected members which is required alongside with their precise matching in cementation. All of this leads to increased cost of production.

SUMMARY OF THE INVENTION

An object of the present invention is to provide a piezoelectric accelerometer with improved stability of working characteristics and to simplify the production technology therefor at the same time.

The above and other objects of the invention are achieved by providing a piezoelectric accelerometer with electrostatic screening, wherein there is at least one piezoelectric element with electrodes accommodated between the inertial mass and the foundation thereof and made, according to the invention, as a single monoblock from piezoelectric material, which is divided by hollows accomodating electrodes into regions serving as the foundation, piezoelectric element, and inertial mass.

It is preferred that the piezoelectric accelerometer be fashioned with hollows shaped as radially arranged cylinders with axes lying in two parallel planes.

The piezoelectric accelerometer also preferably has wedge-shaped hollows arranged symmetrically about the longitudinal axis of the block.

It is desirable to provide a piezoelectric accelerometer whose hollows are shaped as two coaxial cylinders with bottoms, the inner cylinder being directed with its open butt end toward the bottom of the outer cylinder.

It is also preferred to provide a piezoelectric accelerometer with hollows whose surfaces are all coated with a current-conducting coating serving as an electrode.

The proposed construction of the piezoelectric accelerometer makes it possible to substantially increase the stability of its performance characteristics, simplify the production technology therefor and reduce its cost.

BRIEF DESCRIPTION OF THE DRAWING

The invention will be more apparent from the description of exemplary embodiments and the appended drawings wherein.

DETAILED DESCRIPTION

Figure 1:
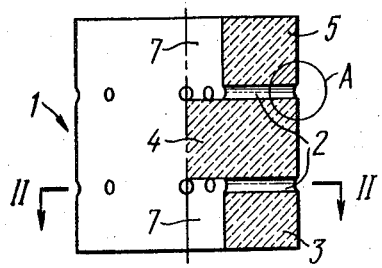
FIG. 1 shows, in partial longitudinal section, a piezoelectric accelerometer provided with hollows shaped as radially arranged cylinders with axes in two parallel planes, according to the invention.

As shown in FIG. 1, a piezoelectric accelerometer of the invention is fashioned as a single cylindrical monolithic block 1 made of piezoelectric ceramics. The body of said monolithic block 1 has hollows 2 shaped as cylinders with a diameter much smaller than that of the block 1 and dividing the latter into regions functioning as foundation 3 of piezoelectric element 4, and inertial mass 5. The hollows 2 are so directed that their longitudinal axes are in two parallel planes.

Figure 2:
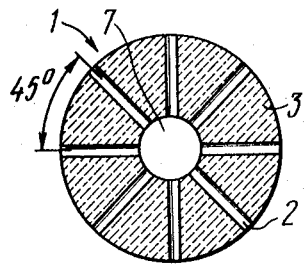
FIG. 2 is a sectional view through line II—II in FIG. 1.

The longitudinal axes of the hollows 2 (FIG. 2) are arranged radially with regard to the longitudinal axis of the block 1, the minimum angle between them being 45°. Applied onto the surface of the hollows 2 is a metal coating serving as electrodes 6 (FIG. 3).

Each of the regions of the block 1 (FIG. 1) that functions as the foundation 3 and the inertial mass 5 has an axial hollow 7 communicating with the hollows 2 for connection of the electrodes 6 accomodated therein. To this end, the surface of the hollows 7 should also be metal plated. The leadouts of the accelerometer (for the sake of convenience, not shown in the drawing) are connected to the plated surfaces of the hollows 7.

Provision of the hollows 2 hardly affects the rigidity of the monolithic block 1, hence the accelerometer being described herein possesses a sufficiently high natural resonance frequency. This appreciably extends the frequency range of accelerations measured by such accelerometer.

Figure 3:
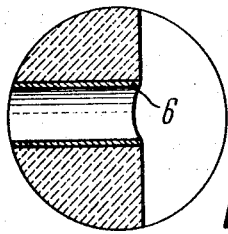
FIG. 3 is an enlarged view of portion A of FIG. 1.

The electrostatic screening of the accelerometer under consideration is in the form of a thin metal coating (not shown) applied onto a thin dielectric sublayer, insulating it from the electrodes 6 (FIG. 3).

Figure 4:
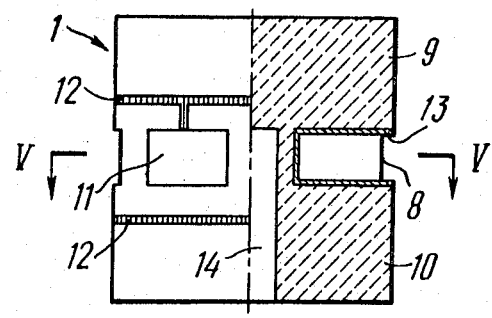
FIG. 4 is a view similar to FIG. 1 of another embodiment with hollows shaped as wedges and arranged symmetrically about the longitudinal axis of the block, according to the invention.
Figure 5:
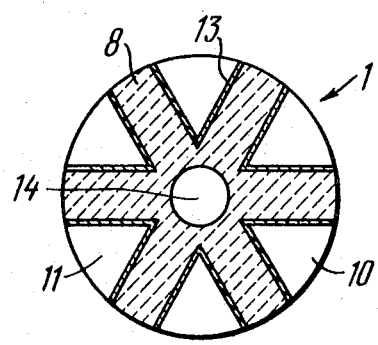
FIG. 5 is a sectional view through line V—V in FIG. 4.

Described hereinbelow with reference to FIGS. 4 and 5 is another exemplary embodiment of the piezoelectric accelerometer, which is similar to that described above.

A feature of the second embodiment is the provision in the monoblock 1 of six wedge-shaped hollows 11 designed to help increase the intrinsic capacitance of the piezoelectric element 8 (FIG. 4) accomodated between the inertial mass 9 and the foundation 10. The wedge-shaped hollows 11 (FIG. 5) are symmetrical about the longitudinal axis of the block 1.

Figure 6:
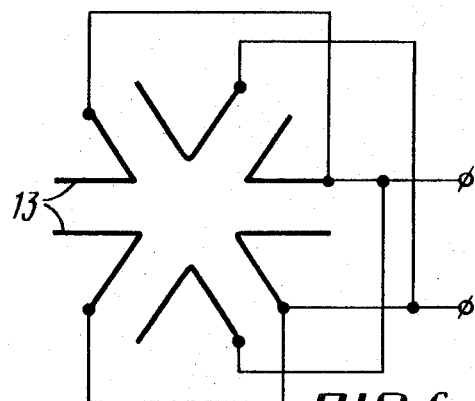
FIG. 6 is the schematic diagram of electrode connections in the accelerometer shown on FIG. 4.

Applied onto the surface of the block 1 (FIG. 4) are current-conducting strips 12 electrically connecting every other electrode 13 (FIG.6), thus insuring proper polarity.

The provision of an axial hollow 14 (FIG. 4) in the body of the block 1, passing through the regions functioning as the foundation 1o and the piezoelectric element 8, is conductive to increasing the sensitivity of the accelerometer and reducing its weight.

Figure 7:
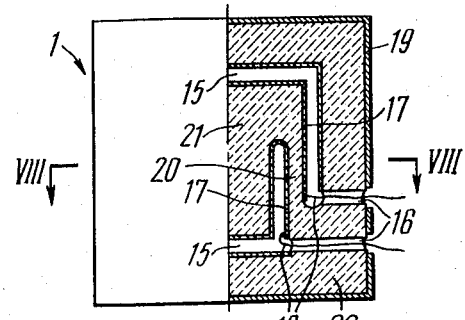
FIG. 7 is a view similar to FIG. 1 of a third embodiment with hollows shaped as two coaxial cylinders with bottoms, wherein the inner cylinder is directed with its open butt end toward the bottom of the outer cylinder.
Figure 8:
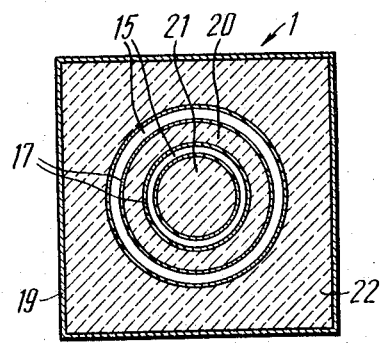
FIG. 8 is a sectional view through line VIII—VIII in FIG. 7.

A third exemplary piezoelectric accelerometer, which is similar to the above two embodiments described herein, appears in FIGS. 7 and 8.

A feature of the third embodiment is that the block 1 (FIG. 7) is made rectangular and has two hollows 15, shaped as coaxial cylinders with bottoms, the inner cylinder being directed with its open butt end toward the bottom of the outer cylinder.

Said hollows 15 communicate with the exterior by means of channels 16 intended for connecting the leadouts 18 of the accelerometer to the electrodes 17.

The electrostatic screening in the accelerometer construction being described is achieved by applying a metal coating 19, devoid of a dielectric sublayer, onto the surface of the block 1 (FIG. 8).

An advantage of the latter accelerometer as compared with those described hereinabove is that any of its edges can be used for its fixation to an object being examined, which is of particular importance for measuring some of the components of acceleration of a given object. This is made possible by insuring similar conditions for both piezoelectric element 20 and the inertial mass 21 in relation to the foundation 22, regardless of the accelerometer face selected for fixation purposes.

To measure the acceleration experienced by an object being examined, any of the above piezoelectric accelerometers must be cemented to the surface of this object by its foundation 3 (10,22), the acceleration of the object being transmitted to the accelerometer.

Other embodiments of the piezoelectric accelerometer having more than one piezoelement are also possible.

The operational principle of all of the above piezoelectric accelerometers is the same and based on the use of the direct piezoelectric effect of piezoelectric ceramics.

In acceleration, the inertial mass 5 (9,21) acts on the piezoelectric element 4 (8,20) of the accelerometer with a force proportional to the acceleration acting upon the accelerometer. This results in an electric signal being induced across the electrodes 6 (13,17), of the piezoelectric element 4 (8,20), said signal being proportional to the instantaneous value of the acceleration. A related measuring instrument connected to the leadouts 18 of the accelerometer can measure and analyze the signal.

The above piezoelectric accelerometers are technologically superior to known instruments, as they are fashioned as a single monolithic block, thus making assembly work unnecessary.

In the above piezoelectric accelerometers, there are no dissimilar materials, nor cemented or any other mechanical connections. Therefore, they are exempt from the influence of such technological and construction factors as the quality of the assembly, properties of an adhesive, quality of finishing and adjustment of separate elements of the construction, as well as the characteristics of such construction (passive) elements as the materials of the body, foundation, and inertial mass.

The characteristics enumerated hereinabove help reduce temperature and time errors, which in the proposed accelerometers depend only upon the natural properties of a piezoelectric material used, and incrase their resistance to radioactive radiation.

The absence of a housing helps reduce the weight of the accelerometer, which sometimes is of a particular importance.

Owing to their technological adaptability, the constructions of the accelerometer described hereinabove can be manufactured in a conventional piezoceramic production line. A serial output of cheap and foolproof accelerometers operating within a wide range of frequencies and having high sensitivity at limited overall sizes and weight can thus be insured.

What we claim is:

1. A piezoelectric accelerometer comprising: a monolithic block of a ceramic piezoelectric material, said block having an outer surface; an electrostatic screening coating the outer surface said monolithic block; said block being provided with hollows dividing the block into parts, one part of said block serving as an inertial mass; another part of said block serving as a foundation; a third part of said block arranged between the first two said parts and serving as at least one piezoelectric element; said hollows thereby dividing the monolithic block into said inertial mass, piezoelectric element and foundation; and electrodes for said piezoelectric element accommodated in said hollows.

2. A piezoelectric accelerometer according to claim 1, wherein said block has a longitudinal axis and said hollows are arranged symmetrically about the longitudinal axis of said monolithic block to provide measurements of accelerations acting along said axis.

3. A piezoelectric accelerometer according to claim 2, wherein said hollows are shaped as cylinders, said cylinders being divided into first and second equal groups; said first group of cylinders having longitudinal axes extending in a plane normal to the longitudinal axis of said monolithic block and being disposed radially with respect thereto; said second group of cylinders having longitudinal axes extending in another plane normal to the longitudinal axis of said monolithic block and being disposed radially with respect thereto; said planes being spaced apart to a distance corresponding to the height of said piezoelectric element.

4. A piezoelectric accelerometer according to claim 2 wherein said hollows are wedge-shaped and have end faces defined by two planes parallel with respect to each other and normal to the longitudinal axis of said monolithic block; said wedge-shaped hollows having side surfaces defined by two intersecting planes with the line of intersection thereof extending in parallel with the longitudinal axis of said monolithic block; said end faces in each of said wedge-shaped hollows being spaced apart to a distance corresponding to the height of said piezoelectric element; the side surfaces of adjacent of the wedge-shaped hollows being spaced apart to a distance corresponding to the thickness of said piezoelectric element.

5. A piezoelectric accelerometer according to claim 2, wherein said hollows are shaped as inner and outer cylinders coaxial with respect to the longitudinal axis of said monolithic block; said inner cylinder having a bottom, side surface and open end; the said outer cylinder having a bottom arranged close to the open end of said inner cylinder; said inner and outer cylinders having side surfaces with the piezoelectric element accommodated therebetween.

6. A piezoelectric accelerometer according to claim 2 wherein said electrodes comprises a current conducting coating in said hollows.

* * * * *